United States Patent [19]

Kakuta

[11] Patent Number: 5,014,512

[45] Date of Patent: May 14, 1991

[54] ACCELERATION DEVICE OF EXHAUST GAS STREAM FOR AN INTERNAL COMBUSTION ENGINE

[76] Inventor: Yoshiaki Kakuta, 1-8-1, Hamakawado, Kasukabe-shi, Saitama-Ken, Japan

[21] Appl. No.: 319,286

[22] Filed: Mar. 6, 1989

[30] Foreign Application Priority Data

Nov. 1, 1988 [JP] Japan .................. 63-276926

[51] Int. Cl.$^5$ .............................................. F01N 5/04
[52] U.S. Cl. .......................................... 60/319; 60/324
[58] Field of Search ................ 60/316, 319, 324; 181/248, 249, 251, 257, 262, 263, 264, 268, 275

[56] References Cited

U.S. PATENT DOCUMENTS

| 1,025,251 | 5/1912 | Desmond | 181/262 |
| 1,865,677 | 7/1932 | Cheyney | 181/264 |
| 3,045,422 | 7/1962 | Houdry | 60/307 |
| 3,658,042 | 4/1972 | Balluff | 60/317 |
| 4,348,862 | 9/1982 | Fujikawa | 181/249 |

FOREIGN PATENT DOCUMENTS

| 226480 | 3/1963 | Austria | 181/264 |
| 607998 | 4/1926 | France | 60/316 |
| 771314 | 7/1934 | France | 181/259 |
| 805014 | 8/1936 | France | 181/240 |
| 1108466 | 8/1955 | France | 181/259 |
| 1310526 | 5/1987 | U.S.S.R. | 181/264 |
| 804440 | 11/1958 | United Kingdom | 60/316 |

*Primary Examiner*—Douglas Hart
*Attorney, Agent, or Firm*—Fleit, Jacobson, Cohn, Price, Holman & Stern

[57] ABSTRACT

This invention provides a device for accelerating an exhaust gas stream discharged from the combustion chamber of an internal combustion engine the flow velocity of said gas stream having been lowered under the internal resistance by passing through the exhaust system ducts, machinery and tools such as catalyzers, mufflers interposed in the exhaust gas stream. The exhaust gas stream the flow velocity of which is accelerated through an acceleration portion or portions as much as possible to the flow velocity of the exhaust gas stream discharged immediately after it has been discharged from the combustion chamber is discharged into the air. As a result thereof, the exhausting efficiency can be improved and the exhausting characteristics are stabilized so that the rotational output is stabilized at the time of low-speed driving, and the decrease of the back pressure contributes at the time of high-speed driving so that it has the advantages that the so-called stretching of the rotation becomes better.

1 Claim, 2 Drawing Sheets

5,014,512

ACCELERATION DEVICE OF EXHAUST GAS STREAM FOR AN INTERNAL COMBUSTION ENGINE

FIELD OF THE INVENTION

This invention relates to a device for accelerating an exhaust gas stream in an internal combustion engine.

DESCRIPTION OF PRIOR ART

Gases generated from the combustion in an internal combustion engine are discharged into the air through a duct of exhaust system. The flow rate of the exhaust gas stream is 650–800 m/sec. at the moment immediately after being discharged from the cylinder, the flow rate being so high as to exceed the velocity of sound, but it promptly decreases to be stabilized at about 200 m/sec.

On the other hand, for example, in the case of a gasoline engine and the like for automobiles, catalyzers, mufflers, etc. are provided under the necessity of measures to counter exhaust gases and noises, by which measures the flow and discharge rates of the exhaust gas stream are lowered.

The inventor of the present invention has been studying the matter with a view that it may be possible to solve the afore-mentioned matter as well as some further points of the problems of internal combustion engines from the side of controlling the exhaust gas stream, the points of problems being, for example, the matters that the rotation of the engine is unstabilized during low rotation as has been seen in conventional high-speed engines for automobiles; that a high-temperature exhaust gas is exhausted; that the filling up efficiency lowers due to the fact that the catalyzers and/or mufflers offer resistance; and that the exhausting volume of noxious ingredient remarkably increases during the actual running even though it may satisfy the rules when being in the idling running.

SUMMARY OF THE INVENTION

As the result of the afore-mentioned study, it has been recognized that very remarkable effects appear in various fields by accelerating the flow velocity of exhaust gas in a proper manner. The manner concerns, for example, a device for directly accelerating the exhaust gas stream in one area thereof without relying upon the driving by any motors that consume the engine output or any devices for preventing the velocity lowering again in the accelerated exhaust gas stream, etc.

Accordingly, the object of the present invention is to provide an acceleration device for an exhaust gas stream in an internal combustion engine in which the afore-noted various problems can be solved by the fact that the exhaust gas stream is accelerated in an area downstream from mufflers and/or catalyzers by means of a device for directly accelerating the flow velocity higher than the regular rate and inducting ambient air into the gas flow in a manner whereby the back pressure and the load resistance is controlled.

The object is attained by the construction wherein an exhaust system duct is provided for discharging into the air the exhaust gas stream discharged from the combustion chamber of the internal combustion engine and includes an acceleration portion for self-accelerating the flow velocity of the exhaust gas stream incorporating one stage or more in the downstream area of the exhaust system duct which is loaded with the resistance of the exhaust system duct itself and/or the load resistance of the catalyzers, mufflers and the like provided in the exhaust system duct.

The exhaust system duct comprises those generally called exhaust pipes in automobile engines and the like, and an acceleration portion is provided in its most downstream area so that the exhaust gas stream is self-accelerated by passing therethrough without help of any driving force. Such an acceleration portion can be formed by providing a throat in the flow passage of the exhaust gas.

One type of the throat comprises for example a Venturi tube construction which changes the sectional area of the flow passage of the exhaust gas stream, or one which gives an acceleration action in accordance with the shape of the interposed matter without changing the sectional area of the flow passage, or one comprising a combination of these types. Such a throat may be provided in a single stage, or in two or more stages spaced along the stream.

BRIEF EXPLANATION OF THE DRAWINGS

The drawings relate to an acceleration device of the exhaust gas stream in an internal combustion engine of the present invention, wherein.

EXAMPLE OF EMBODIMENT

Figure 1:
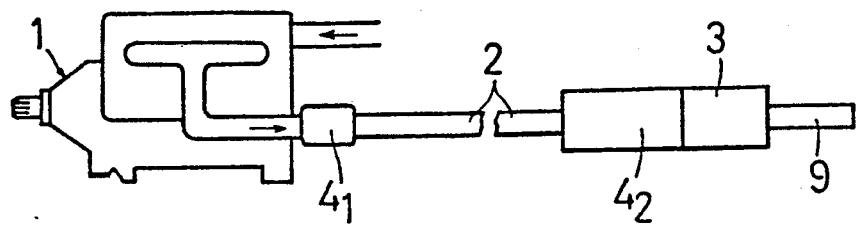
FIG. 1 is a diagram of the entire internal combustion engine provided with such an acceleration device.

Referring now to the drawings, FIG. 1 indicates an internal combustion engine provided with an acceleration device of the present invention, wherein 1 is a body of the internal combustion engine; 2 is an exhaust system duct; 3 indicates an acceleration portion; and on the exhaust system duct 2 there is provided a load such as a catalyzer $4_1$, a muffler $4_2$ and thereafter is provided an acceleration portion 3. If the acceleration device is arranged in front of the load the accelerated exhaust gas stream will be retarded again so that the expected object will not be achieved. As an acceleration device, various types of construction may be selected such as shown in the type specimen of FIG. 2, also shown in detail in FIG. 3 as well as the type specimens shown in FIGS. 4, 5 and FIGS. 6, 7.

The first type comprises an acceleration device having an acceleration portion 3 which is provided with a single throat 5 along the flow line direction of the exhaust gas stream, the throat 5 being provided at the minimum diameter portion of a taper form throttle pipe 7 for converting the kinetic energy of the exhaust gas stream into the flow velocity by gradually decreasing the sectional area of an exhaust stream passage 6.

Figure 3:
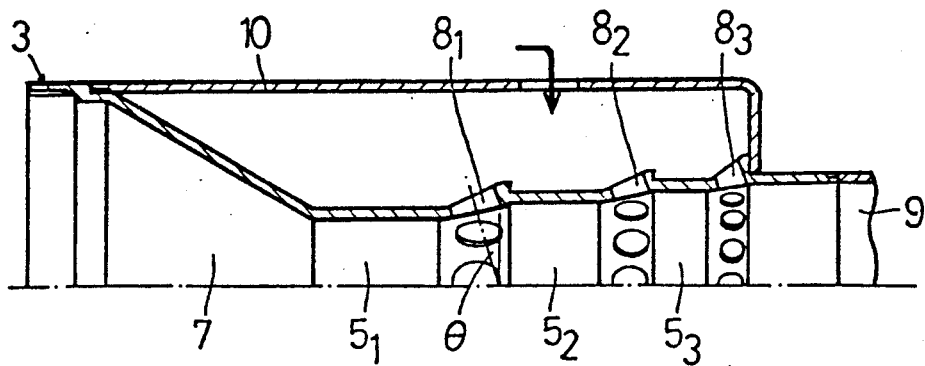
FIG. 3 is a partially sectional view of a first example showing a throat of the acceleration portion.

As shown in detail in FIG. 3, in the acceleration portion 3 there is provided also an air suction construction comprising air suction ports $8_1$, $8_2$, $8_3$ each immediately after the first, second and third throats $5_1$, $5_2$, $5_3$ so that the exhaust gas stream may be accelerated resulting simultaneously in the formation of strong negative pressure that may suck the air in three stages. Each of the throats is arranged for example so as to be increased by two times in capacity so that the exhaust gas stream may be discharged smoothly through a tail tube 9 together with the suction air stream. The suction air ports $8_1$, $8_2$, $8_3$ may preferably be provided with an angle $\theta$ so as to accelerate the suctioning action. 10 indicates a casing.

The air stream introduced by this negative pressure can be utilized for various uses. For example, if the accelerated exhaust gas stream and the air stream are made to strike each other at full speed the noxious components such as CO, $NO_x$, etc. in the exhaust gas can sharply be decreased. This may result because of the chemical reaction of the air and the ingredients in the exhaust gas caused by sharp disturbance due to the collision whereat it has been recognized that a large quantity of water was produced. Other uses are utilization of suction air stream such as for example air cooling of engines and driving of superchargers, etc.

Figure 4:
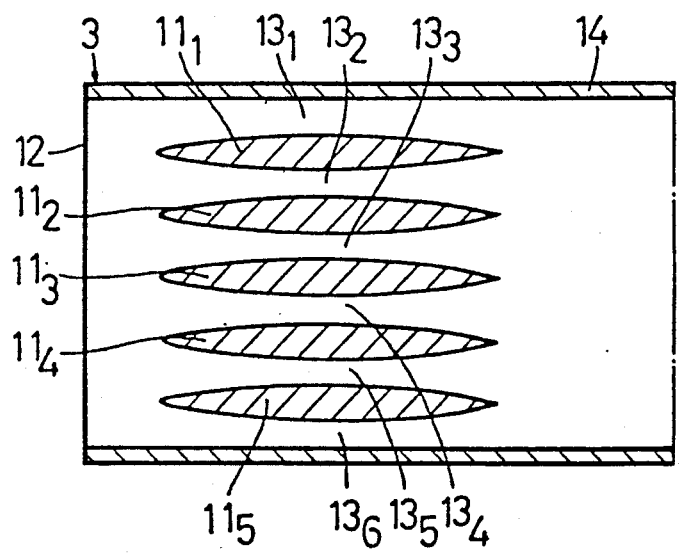
FIG. 4 shows a sectional view of a second example of the acceleration portion.

The acceleration portion 3 indicated in FIG. 4 is of a type wherein a proper number of wing sectional form accelerators 11 are arranged interposedly in parallel with the streamline so as to form a plurality of throats $13_1$, $13_2$... in the flow passage 12. Also in this case, the sectional area through which can pass the exhaust gas is decreased, but the acceleration by means of the wing-form accelerators 11 utilizes the phenomenon that the acceleration is brought by the exhaust gas passing along the surfaces of the accelerators. As the wing-like sectional shape, besides those of highspeed type any types optimum for acceleration can be used, but in order to avoid any bad effects due to a rise of acoustic waves it may be possible to make changes at option for disposing each of the accelerators 11 forwardly and/or backwardly in a shifting manner.

Figure 2:
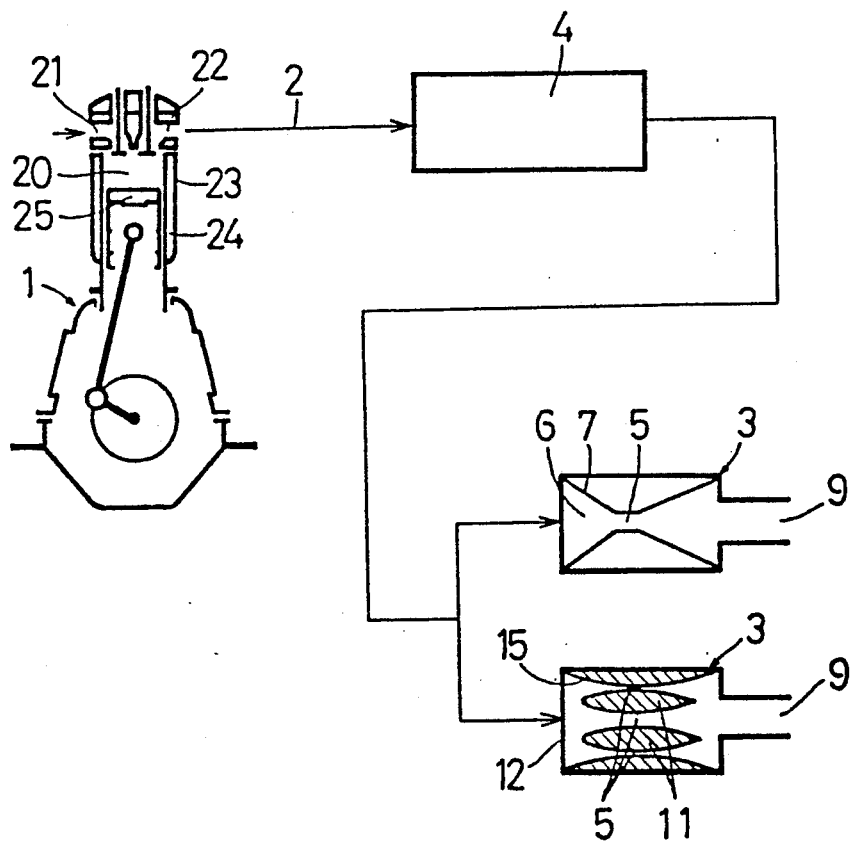
FIG. 2 is a type diagram showing an internal combustion engine and two types of acceleration devices to be optionally combined therewith.
Figure 5:
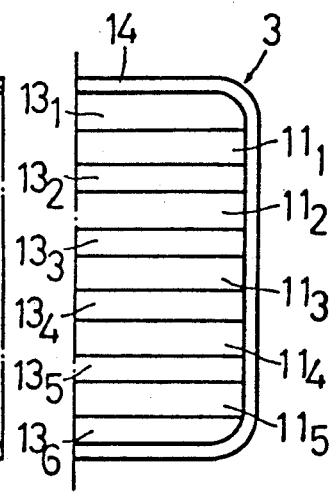
FIG. 5 shows a partial front elevation of the example of FIG. 4.

The acceleration duct 14 forming the flow passage can employ not only those of circular section but also of square section as shown in FIG. 5 and can also be provided with a curved surface 15 on the inner wall (ref. to FIG. 2).

Figure 6:
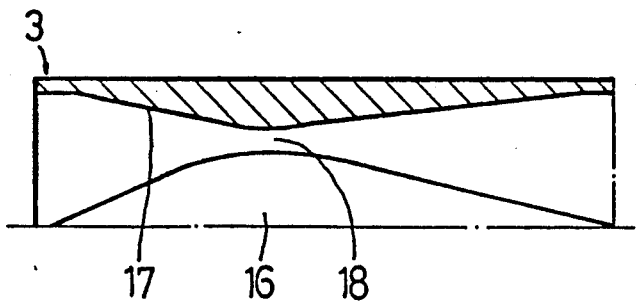
FIG. 6 shows a partial sectional view of a third example of the acceleration portion.
Figure 7:
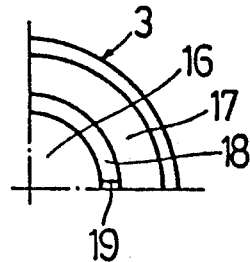
FIG. 7 shows a partial front elevation thereof.

Also, FIG. 6 and FIG. 7 show certain types wherein a throttle pipe 17 and an accelerator 16 are combined to constitute the acceleration portion 3 in which a throat 18 is formed between the taper type throttle pipe portion 17 and the spindle type accelerator 16 which is set at the central portion by a support wing 19.

The above-indicated acceleration portion 3 can be provided in multiple stages in the flow direction.

In FIG. 2, 20 is a combustion chamber; 21 a suction port; 22 an exhaust port; 23 a cylinder; 24 a jacket through which circulates the cooling liquid in the case of the device being of a liquid cooling type, but in the example shown in FIG. 3, when the air is forcedly suctioned into the jacket 24 by negative pressure produced therein the afore-mentioned jacket becomes an air jacket. 25 is a piston. All kinds of combustion engines may be the objects to which can be applied the device of the present invention.

When an acceleration device of the present invention is incorporated in the exhaust pipe 2 of the combustion engine, the exhaust gas stream passing through the pipe 2 downstream from the muffler $4_2$ will be accelerated when passing through the throats 5, 11, 18 at the acceleration portion 3.

Further, in the exhaust system utilizing the device of the present invention, the back pressure never becomes too large. The device of the present invention becomes a load on the exhaust system in case of the low speed rotation and acts to induce torque. Also, in the device of the present invention, the acceleration action is increased in proportion to the increase of the kinetic energy of exhaust gas.

As described above, the acceleration device of exhaust gas stream of the present invention exhibits the effect of improving the flow velocity of exhaust gas stream in the acceleration portion 3 with the operation of the engine 1 being stabilized such that the torque being produced when in the low speed rotation is increased, with excessive back pressure being avoided so as to improve the induction efficiency of the engine 1. Further, the acceleration portion of FIG. 3 is capable of removing noxious components through the high speed collision of the exhaust gas with the induced ambient.

What is claimed is:

1. In combination with an internal combustion engine including an exhaust system pipe for discharging exhaust gasses from said engine into the air, said exhaust system pipe including an acceleration portion for self accelerating the flow velocity of the exhaust gas stream disposed in at least one stage in the downstream area of said exhaust system pipe, said pipe being loaded with the resistance of itself and a catalyzer and a muffler provided in said exhaust system pipe upstream from said acceleration portion, said acceleration portion comprising a throttle pipe throat for converting the kinetic energy of the exhaust gas stream into the flow velocity, said acceleration portion including sectional area decreasing means gradually decreasing the sectional area of the flow passage of said exhaust pipe, said acceleration portion defining a sectional zone of lowest section, the section of said lowest section being predetermined relative to the displacement of said engine and the expected operating speed range thereof, whereby said acceleration portion will not be so restrictive to gas flow therethrough during high engine speed operation to result in too large back pressure, but in case of low engine speed operation back pressure will be increased an amount to induce low speed torque, said acceleration portion thereby serving to modulate exhaust back pressures in said exhaust pipe system, said sectional area decreasing means including sectional area increasing means successively step-increasing said sectional area immediately downstream from said section of said lowest section, and educting means for educting gas into each sectional area of increasing sectional area between successive step-increased sectional areas.

* * * * *